UNITED STATES PATENT OFFICE.

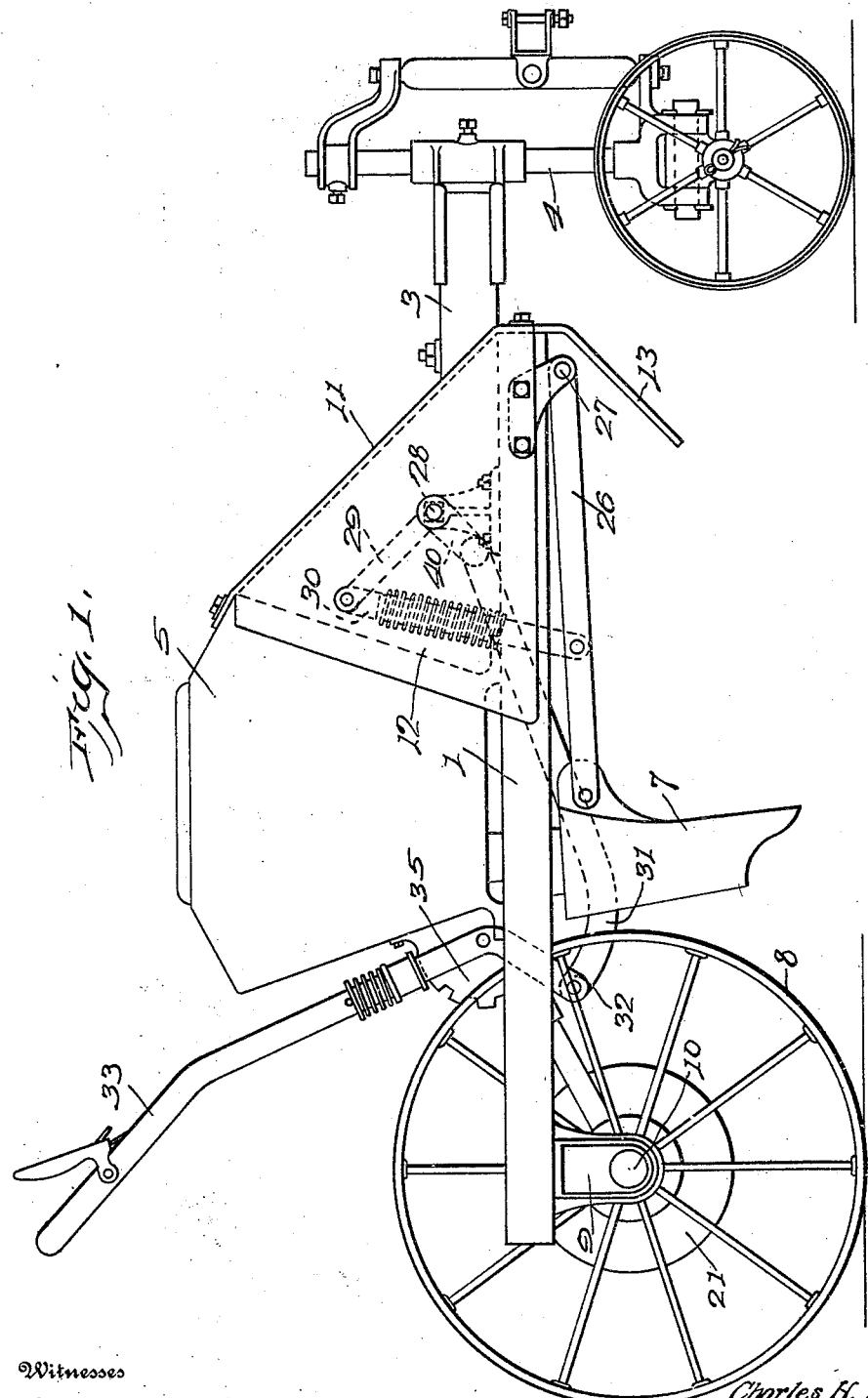

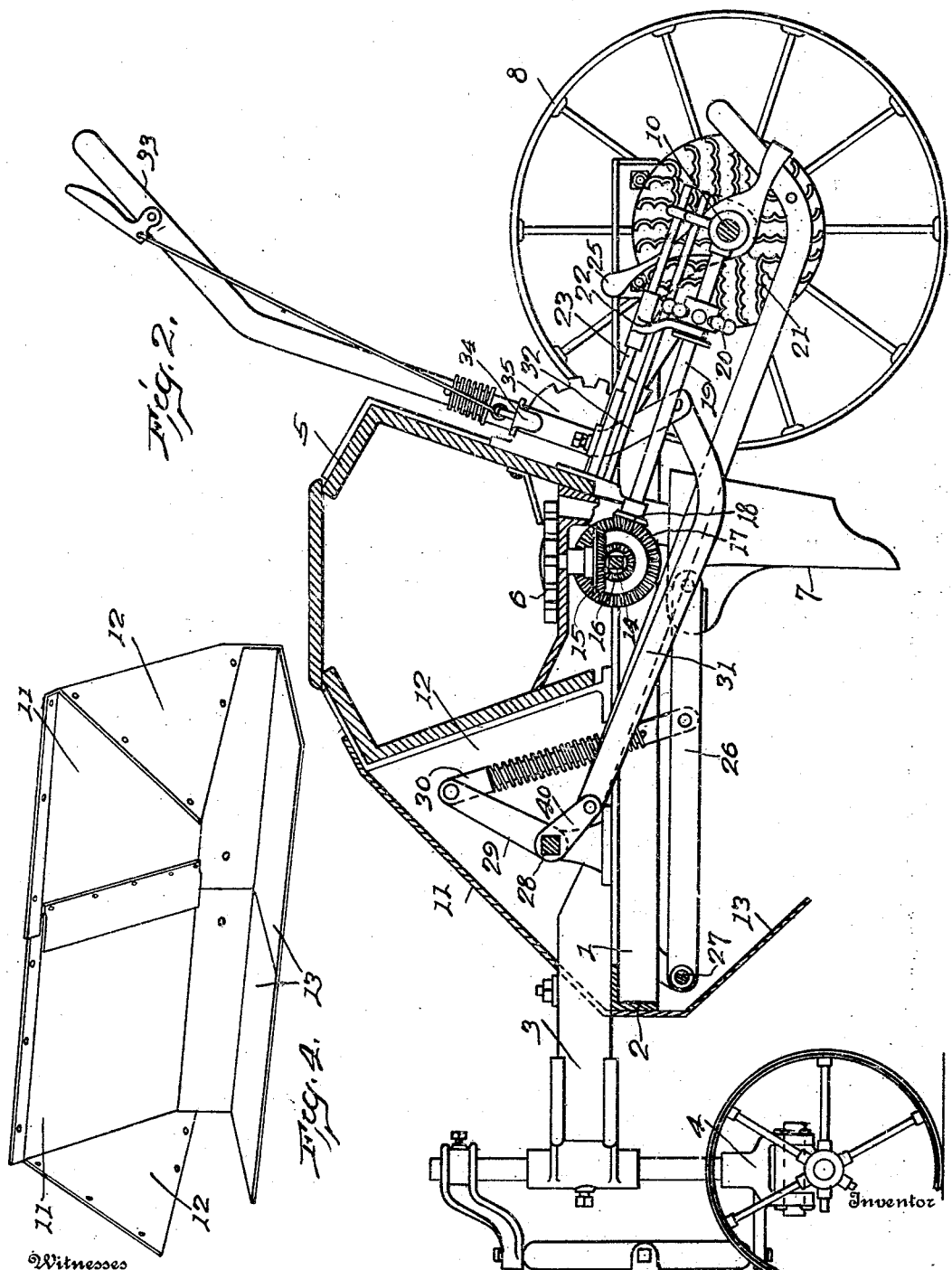

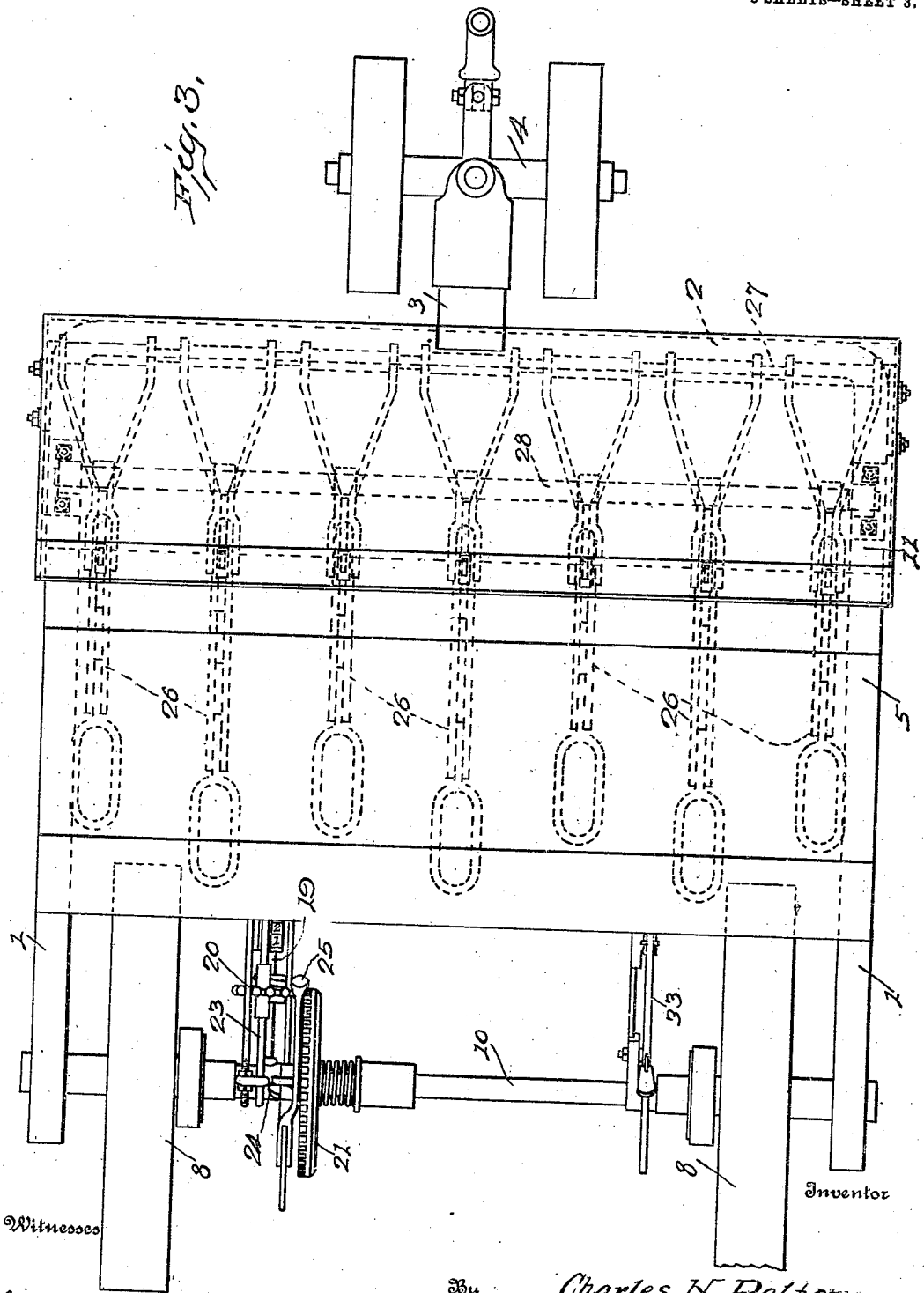

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

FERTILIZER-DISTRIBUTER.

955,354. Specification of Letters Patent. Patented Apr. 19, 1910.

Application filed November 24, 1909. Serial No. 529,668.

*To all whom it may concern:*

Be it known that I, CHARLES H. PELTON, a citizen of the United States, residing at Springfield, in the county of Clark and State of Ohio, have invented certain new and useful Improvements in Fertilizer-Distributers, of which the following is a specification, reference being had therein to the accompanying drawings.

This invention relates to fertilizer distributers and is designed more particularly for distributing fertilizer in orange groves.

In fertilizing orange groves it is desirable that the fertilizer should be placed close to the trunks of the trees and it is necessary to distribute the same while the trees are bearing fruit. Inasmuch as the fruit laden branches of the trees hang very low, particularly in the case of a navel orange tree, the proper distribution of the fertilizer by means of a fertilizer distributer of ordinary construction causes the fruit laden branches of the trees to come in contact with the machine and to become caught in the spokes of the wheels and other exposed parts of the machine, thus breaking the branches and stripping the fruit therefrom to such an extent as to entail a serious loss.

The object of the present invention is to provide a machine with which the fertilizer can be distributed as close as desired to the trunks of the trees without injuring the branches of the trees or stripping the fruit therefrom.

To this end it is a further object of the invention to construct a fertilizer distributer in which the exposed parts will be guarded to prevent the branches and their fruit from coming in contact therewith and in which the ground wheels will be so arranged that there will be little or no liability of the branches coming in contact with them, thus enabling the distributer to pass under the low hanging, fruit laden branches without injury either to the branches or the fruit.

A further object of the invention is to so arrange the ground wheels and their axle, in such a machine, as to enable the distributing mechanism to be driven directly from this axle.

In the accompanying drawings, Figure 1 is a side elevation of a fertilizer distributer embodying my invention; Fig. 2 is a sectional view, taken longitudinally of such a machine; Fig. 3 is a top plan view of the same; and Fig. 4 is a detail view of the shields.

In these drawings I have illustrated one embodiment of my invention and have shown the same as comprising a main frame 1 which is preferably substantially U-shaped and has its transverse member 2 arranged at the forward end thereof. A stub tongue 3 is rigidly secured to the main frame and is supported at its forward end near the center thereof by means of a swiveled truck 4 having a suitable draft hitch. A hopper 5 for the fertilizer is mounted upon the main frame at a point substantially midway between the front and rear ends thereof and is provided with suitable feed devices 6 which are actuated in the manner hereinafter described, and by means of which the fertilizer is fed through the openings in the hopper to the several boots 7 which deposit it in the ground. The main frame 1 is supported at its rear end by means of ground wheels 8 which are of a height less than the height of the hopper 5 and which are preferably arranged in the rear of the hopper 5 and in positions within the planes of the outer ends of said hopper, as clearly shown in Fig. 3. To this end, I have, in the present instance, provided the rearwardly extending side members of the main frame 1 with depending brackets 9, in which is journaled the axle 10, upon which are mounted the ground wheels 8, these ground wheels being arranged on the axle 10 between the side members of the main frame and preferably close to their respective side members.

A suitable shield or guard 11 is arranged at each forward corner of the hopper 5 and extends downwardly and forwardly therefrom. In the present instance the combined width of the two shields is substantially equal to the width of the hopper and the two shields are connected at their adjacent edges so as to form in effect a single shield which is secured at its upper edge to the forward edge of the hopper and extends downwardly and forwardly over the transverse member 2 of the main frame and is secured thereto, thus forming a smooth, easy incline which will engage the branches of the trees as the distributer moves beneath the same and will raise them gently to the top of the hopper from which they will swing free, as the distributer moves forward, without engaging the low ground wheels in the rear of the hopper. Each shield 11 has secured to its outer end a triangular portion 12 which is secured at one edge to the hopper and at the other edge to the main frame, thus completely closing the space between the shield and the hopper and frame and preventing the branches or fruit from being caught in the angle formed at the point of connection of the hopper to the frame. I also prefer to extend the shield some distance below the main frame, as shown at 13, this downwardly extending portion being inclined rearwardly. By means of this arrangement those branches which hang lower than the main frame will be engaged by the downwardly extending portion 13 which will cause the same either to ride up over the shield or will force them to one side, and, in either case, will prevent them from coming into injurious contact with the machine. Those branches which do not pass over the hopper, but bear against the end portion 12 of the shield and the end of the hopper will be engaged by the rearwardly extending side portions of the frame which serve as fenders to hold these branches out of engagement with the ground wheels.

The fertilizer feeding devices 6, which are mounted within the hopper, are preferably driven directly from the axle 10, and, in the present instance, I have shown each of these feeding devices as connected to a shaft 14 by means of bevel pinions 15 and 16. The shaft 14 has mounted thereon a bevel gear 17 which meshes with a bevel pinion 18 on the shaft 19, which, in turn, has slidably mounted thereon a toothed pinion 20 which is adapted to mesh with a driving gear 21 mounted on the axle 10 and having a series of annular rows of teeth arranged in the face thereof. By moving the pinion 20 into engagement with different rows of teeth the fertilizer will be fed from the hopper at different speeds and different quantities distributed over a given area. This adjustment of the toothed pinion 20 is preferably accomplished by means of a yoke 22 secured to an adjustable rod 23 which is adapted to be supported in different positions, thereby enabling the pinion 20 to engage different rows of teeth on the gear 21. The gear 21 has suitable clutch mechanism 24 adapted to be actuated by a handle 25, by means of which it is connected to and disconnected from the axle 10 to start or stop the operation of the feeding devices. This clutch mechanism *per se* is not a part of the present invention and need not be here shown or described in detail. The essential feature of the arrangement is that the axle is so arranged as to support the ground wheels in the rear of the hopper, and, at the same time, to permit the feeding devices to be driven directly from the axle 10 of the wheels. The several boots 7 are each supported at the rear end of an arm or drag bar 26, which arms are pivotally mounted at their forward ends on a shaft 27.

To enable the operator to move the boots 7 into and out of engagement with the ground I have mounted on the main frame 1 a shaft or transverse bar 28 having a series of arms 29, each of which is connected by a link 30 with one of the arms 26 carrying one of the boots 7. The shaft 28 is rocked by means of a crank arm 40 which is connected by means of a rod or link 31 with the lower end of a lever 32 having at its upper end a handle 33 arranged in position to be grasped by the operator and provided with the usual dog 34 adapted to engage the toothed segment 35 to lock the handle in its adjusted position. It will be noted that the connection between the handle and the supporting arms 26 is such that, when the boots are in their lowermost or operative position, the handle will also be in its lower position and will not extend upwardly in such a manner as to engage the branches of the trees.

It will be apparent that the construction of the machine, the arrangement of the ground wheels and of the shields is such as to afford a smooth external surface to the machine and a surface which will either brush the branches aside or gradually raise the same over the hopper; that the branches so raised above the hopper will pass over the rear edge of the same without coming into contact, or at least, into injurious contact with the ground wheels; that those branches which brush against the sides of the frame and the hopper will not come into contact with the ground wheels, as these are set inside of the main frame and at a point slightly removed from the plane of the ends of the hopper; and, further, that the side members of the main frame serve as fenders to prevent the branches being engaged by the spokes of the wheels. Consequently, it is possible to drive this machine close to the trunks of trees as it will pass under the low hanging, fruit laden branches without either injuring the branches or stripping the fruit therefrom. And further, it will be apparent that the arrangement of the ground wheels and their axle relatively to the hopper is such as to enable the axle to be directly connected to the feed mechanism for actuating the same.

I wish it to be understood that I do not desire to be limited to the details of construction shown and described, for obvious modifications will occur to a person skilled in the art.

Having thus fully described my invention, what I claim as new and desire to secure by Letters Patent, is:—

1. A fertilizer distributer comprising a main frame, ground wheels therefor, a hopper mounted on said main frame, and a shield extending downwardly and forwardly from a point near the top of said hopper.

2. A fertilizer distributer comprising a main frame, ground wheels therefor, a hopper mounted on said main frame at a point removed from the forward end thereof, and a shield secured at its upper end to said hopper near the top thereof and at its lower end to the forward portion of said main frame.

3. A fertilizer distributer comprising a main frame, ground wheels therefor, a hopper mounted on said main frame, and a shield extending downwardly and forwardly from each of the upper forward corners of said hopper.

4. A fertilizer distributer comprising a main frame, ground wheels therefor, a hopper mounted on said main frame, a shield extending downwardly and forwardly from said hopper and having a triangular side portion adapted to close the space between said shield and said hopper and main frame.

5. A fertilizer distributer comprising a main frame, ground wheels therefor, a hopper mounted on said main frame at a point removed from the forward end thereof, a shield secured at its upper edge to said hopper near the top thereof and extending downwardly and forwardly about the forward portion of said main frame and having a portion extending downwardly and rearwardly from said forward portion of said main frame.

6. A fertilizer distributer comprising a main frame, a hopper supported by said main frame, ground wheels, of less height than the height of said hopper, supporting said main frame and arranged in the rear of said hopper and between the planes of the ends thereof, and a shield extending downwardly and forwardly from a point near the top of the hopper.

7. A fertilizer distributer comprising a main frame, a hopper mounted on said main frame at a point removed from the forward end thereof, said main frame having side members extending in the rear of said hopper, ground wheels, of less height than the height of said hopper, supporting said main frame and arranged between said rearwardly extending side members, shields secured to said hopper near the top thereof and extending downwardly and forwardly to the forward portion of said main frame.

In testimony whereof, I affix my signature in presence of two witnesses.

CHARLES H. PELTON.

Witnesses:
J. FRED ANDERSON,
HARRIET L. HAMMAKER.